US008751053B2

(12) United States Patent
Hadar et al.

(10) Patent No.: US 8,751,053 B2
(45) Date of Patent: *Jun. 10, 2014

(54) METHOD AND SYSTEM TO PROVIDE A DISTRIBUTED LOCAL ENERGY PRODUCTION SYSTEM WITH HIGH-VOLTAGE DC BUS

(75) Inventors: Ron Hadar, Cupertino, CA (US); Stuart D. Davis, San Jose, CA (US)

(73) Assignee: Tigo Energy, Inc., Los Gatos, CA (US)

( * ) Notice: Subject to any disclaimer, the term of this patent is extended or adjusted under 35 U.S.C. 154(b) by 294 days.

This patent is subject to a terminal disclaimer.

(21) Appl. No.: 11/875,799

(22) Filed: Oct. 19, 2007

(65) Prior Publication Data

US 2008/0097655 A1      Apr. 24, 2008

Related U.S. Application Data

(60) Provisional application No. 60/852,961, filed on Oct. 19, 2006.

(51) Int. Cl.
*G06F 19/00* (2011.01)
*H02J 13/00* (2006.01)
*H02J 3/38* (2006.01)

(52) U.S. Cl.
CPC ............... *H02J 13/002* (2013.01); *H02J 3/387* (2013.01); *Y04S 40/121* (2013.01); *Y04S 10/123* (2013.01); *H02J 3/386* (2013.01); *Y02E 10/763* (2013.01); *Y02E 40/76* (2013.01); *Y02E 40/72* (2013.01); *Y04S 10/545* (2013.01); *H02J 3/382* (2013.01); *Y02E 10/58* (2013.01); *H02J 13/0082* (2013.01); *H02J 3/385* (2013.01); *Y02E 60/7815* (2013.01)
USPC ............. 700/286; 700/291; 323/268; 307/80; 702/65

(58) Field of Classification Search
USPC ........ 700/286, 291; 323/268; 307/80; 702/65
See application file for complete search history.

(56) References Cited

U.S. PATENT DOCUMENTS 4,649,334 A   3/1987 Nakajima
5,235,266 A   8/1993 Schaffrin
(Continued)

FOREIGN PATENT DOCUMENTS

AU   2005262278   7/2005
DE   4232356      3/1994
(Continued)

OTHER PUBLICATIONS http://web.archive.org/web/20041210095723/en.wikipedia.org/wiki/Electric_power_transmission, published Jan. 30, 2005.*

(Continued)

*Primary Examiner* — Tejal Gami
(74) *Attorney, Agent, or Firm* — Greenberg Traurig LLP

(57) ABSTRACT

A method and system to provide a distributed local energy production system with high-voltage DC bus is disclosed. In one embodiment, a system comprises a management unit to be interconnected via a network bus to a set of link modules, each link module coupled to a separate local energy production unit, each link module to include a Maximum Power Point Tracking (MPPT) step-up converter and a parameter monitoring unit to produce parameter data for the respective local energy production unit, and the local energy production units to be coupled to a high voltage power line to deliver produced electrical energy to a consumer of the energy; and the management unit to receive measured parameters from the link modules, and to send control signals to link modules to provide individual operational control of the local energy production units, the management unit to be coupled to one or more separate computers to provide the computers with access to the parameter data and control of the local energy production units.

17 Claims, 3 Drawing Sheets

(56) References Cited

U.S. PATENT DOCUMENTS

| | | | |
|---|---|---|---|
| 5,268,832 A | 12/1993 | Kandatsu | |
| 5,504,418 A | 4/1996 | Ashley | |
| 5,604,430 A | 2/1997 | Decker et al. | |
| 5,648,731 A | 7/1997 | Decker et al. | |
| 5,892,354 A | 4/1999 | Nagao et al. | |
| 5,923,158 A | 7/1999 | Kurokami et al. | |
| 5,929,614 A | 7/1999 | Copple | |
| 6,175,219 B1 | 1/2001 | Imamura et al. | |
| 6,262,558 B1 * | 7/2001 | Weinberg | 320/101 |
| 6,275,016 B1 | 8/2001 | Ivanov | |
| 6,281,485 B1 | 8/2001 | Siri | |
| 6,369,462 B1 | 4/2002 | Siri | |
| 6,448,489 B2 | 9/2002 | Kimura et al. | |
| 6,590,793 B1 | 7/2003 | Nagao et al. | |
| 6,650,031 B1 | 11/2003 | Goldack | |
| 6,765,315 B2 | 7/2004 | Hammerstrom et al. | |
| 6,810,339 B2 | 10/2004 | Wills | |
| 6,844,739 B2 | 1/2005 | Kasai et al. | |
| 6,894,911 B2 | 5/2005 | Telefus et al. | |
| 6,914,418 B2 | 7/2005 | Sung | |
| 6,966,184 B2 | 11/2005 | Toyomura et al. | |
| 6,984,970 B2 | 1/2006 | Capel | |
| 7,061,214 B2 | 6/2006 | Mayega | |
| 7,126,053 B2 | 10/2006 | Kurokami et al. | |
| 7,150,938 B2 | 12/2006 | Munshi et al. | |
| 7,158,395 B2 | 1/2007 | Deng et al. | |
| 7,248,946 B2 | 7/2007 | Bashaw et al. | |
| 7,256,566 B2 | 8/2007 | Bhavaraju et al. | |
| 7,276,886 B2 | 10/2007 | Kinder | |
| 7,324,361 B2 | 1/2008 | Siri | |
| 7,432,691 B2 | 10/2008 | Cutler | |
| 7,456,523 B2 | 11/2008 | Kobayashi | |
| 7,518,346 B2 | 4/2009 | Prexl | |
| 7,538,451 B2 | 5/2009 | Nomoto | |
| 7,595,616 B2 | 9/2009 | Prexl | |
| 7,605,498 B2 | 10/2009 | Ledenev et al. | |
| 7,629,708 B1 | 12/2009 | Meyers et al. | |
| 7,709,727 B2 | 5/2010 | Roehrig et al. | |
| 7,719,140 B2 | 5/2010 | Ledenev et al. | |
| 7,768,244 B2 | 8/2010 | Perol | |
| 7,778,056 B2 | 8/2010 | Geissler | |
| 8,058,747 B2 | 11/2011 | Avrutsky | |
| 8,098,055 B2 | 1/2012 | Avrutsky | |
| 8,102,144 B2 * | 1/2012 | Capp et al. | 320/101 |
| 2003/0156439 A1 | 8/2003 | Ohmichi | |
| 2004/0167676 A1 * | 8/2004 | Mizumaki | 700/286 |
| 2004/0207366 A1 | 10/2004 | Sung | |
| 2005/0041442 A1 | 2/2005 | Balakrishnan | |
| 2005/0057214 A1 | 3/2005 | Matan | |
| 2005/0057215 A1 | 3/2005 | Matan | |
| 2005/0105224 A1 | 5/2005 | Nishi | |
| 2005/0162018 A1 * | 7/2005 | Realmuto et al. | 307/44 |
| 2005/0172995 A1 | 8/2005 | Rohrig et al. | |
| 2005/0213272 A1 | 9/2005 | Kobayashi | |
| 2005/0275386 A1 | 12/2005 | Jepsen et al. | |
| 2006/0001406 A1 | 1/2006 | Matan | |
| 2006/0017327 A1 | 1/2006 | Siri et al. | |
| 2006/0174939 A1 | 8/2006 | Matan | |
| 2006/0176031 A1 | 8/2006 | Forman | |
| 2006/0185727 A1 | 8/2006 | Matan | |
| 2007/0024257 A1 * | 2/2007 | Boldo | 323/282 |
| 2007/0044837 A1 | 3/2007 | Simburger et al. | |
| 2007/0103108 A1 | 5/2007 | Capp et al. | |
| 2007/0133241 A1 | 6/2007 | Mumtaz et al. | |
| 2007/0164612 A1 | 7/2007 | Wendt et al. | |
| 2007/0273351 A1 | 11/2007 | Matan | |
| 2008/0036440 A1 | 2/2008 | Garmer | |
| 2008/0121272 A1 | 5/2008 | Besser et al. | |
| 2008/0122449 A1 | 5/2008 | Besser et al. | |
| 2008/0122518 A1 | 5/2008 | Besser et al. | |
| 2008/0143188 A1 | 6/2008 | Adest et al. | |
| 2008/0147335 A1 | 6/2008 | Adest et al. | |
| 2008/0150366 A1 | 6/2008 | Adest et al. | |
| 2008/0150484 A1 | 6/2008 | Kimball et al. | |
| 2008/0164766 A1 | 7/2008 | Adest et al. | |
| 2008/0179949 A1 | 7/2008 | Besser et al. | |
| 2008/0191560 A1 | 8/2008 | Besser et al. | |
| 2008/0191675 A1 | 8/2008 | Besser et al. | |
| 2008/0303503 A1 * | 12/2008 | Wolfs | 323/301 |
| 2009/0069950 A1 | 3/2009 | Kurokami et al. | |
| 2009/0150005 A1 | 6/2009 | Hadar et al. | |
| 2010/0026097 A1 | 2/2010 | Avrutsky | |
| 2010/0027297 A1 | 2/2010 | Avrutsky | |

FOREIGN PATENT DOCUMENTS

| | | |
|---|---|---|
| DE | 19961705 | 7/2001 |
| EP | 1388774 | 2/2004 |
| ES | 2249147 | 3/2006 |
| JP | 2003102134 A * | 4/2003 |
| KR | 20080065817 | 7/2008 |
| WO | 03012569 | 2/2003 |

OTHER PUBLICATIONS

Alonso, R., et al., "A New Distributed Converter Interface for PV Panels," 20th European Photovoltaic Solar Energy Conference, Barcelona, Spain, pp. 2288-2291, Jun. 6-10, 2005.

Alonso, R., et al., "Experimental Results of Intelligent PV Module for Grid-Connected PV Systems," 21st European Photovoltaic Solar Energy Conference, Dresden, Germany, pp. 2297-2300, Sep. 4-8, 2006.

Enslin, Johan H. R., et al., "Integrated Photovoltaic Maximum Power Point Tracking Converter," IEEE Transactions on Industrial Electronics, vol. 44, No. 6, pp. 769-773, Dec. 1997.

Roman, Eduardo, et al., "Intelligent PV Module for Grid-Connected PV Systems," IEEE Transactions on Industrial Electronics, vol. 53, No. 4, pp. 1066-1073, Aug. 2006.

Walker, Jeffrey R., et al., "Cascaded DC-DC Converter Connection of Photovoltaic Modules," IEEE Transactions on Power Electronics, vol. 19, No. 4, pp. 1130-1139, Jul. 2004.

Basso, Tim, "IEEE Standard for Interrconnecting Distributed Resources With the Electric Power System," IEEE PES Meeting, Jun. 9, 2004.

Boostbuck.com, "The Four Boostbuck Topologies," located at http://www.boostbuck.com/TheFourTopologies.html, 2003.

Gautam, Nalin K. et al., "An Efficient Algorithm to Simulate the Electrical Performance of Solar Photovoltaic Arrays," Energy, vol. 27, No. 4, pp. 347-361, 2002.

International Patent Application PCT/US08/75127, International Search Report and Written Opinion (mailed Apr. 28, 2009).

Nordmann, T. et al., "Performance of PV Systems Under Real Conditions," European Workshop on Life Cycle Analysis and Recycling of Solar Modules, The "Waste" Challenge, Brussels, Belgium, Mar. 18-19, 2004.

Linares, Leonor et al., "Improved Energy Capture in Series String Photovoltaics via Smart Distributed Power Electronics," 24th Annual IEEE Applied Power Electronics Conference and Exposition, pp. 904-910, Feb. 15, 2009.

Baek, Ju-Won et al., "High Boost Converter using Voltage Multiplier," 2005 IEEE Conference, IECON 05, pp. 567-572, Nov. 2005.

Transaction History of related U.S. Appl. No. 12/392,042, filed Feb. 24, 2009, entitled "Method and System to Provide a Distributed Local Energy Production System and High-Voltage DC Bus."

Transaction History of related U.S. Appl. No. 12/202,110, filed Aug. 29, 2008, entitled "Step-Up Converter Systems and Methods."

Transaction History of related U.S. Appl. No. 12/340,540, filed Dec. 19, 2008, entitled "System to Connect Multiple Direct Current Energy Sources to an Alternating Current System."

Walker, G. R. et al., "Cascaded DC-DC Converter Connection of Photovoltaic Modules," 33rd IEEE Power Electronics Specialists Conference (PESC'02), vol. 1, pp. 24-29, 2002.

Quaschning, V. et al., "Cost Effectiveness of Shadow Tolerant Photovoltaic Systems," Euronsun 96, pp. 819-824, Sep. 16, 1996.

(56) References Cited

OTHER PUBLICATIONS

Palma, L. et al., "A Modular Fuel Cell, Modular DC-DC Converter Concept for High Performance and Enhanced Reliability," 38th IEEE Power Electronics Specialists Conference (PESC'07), pp. 2633-2638, Jun. 17, 2007.

Philips Electronics, N.V., "Data Sheet: PSMN005-55B; PSMN005-55P: N-channel logic level TrenchMOS(TM) transistor," product specification, Oct. 1999.

Uriarte, S. et al., "Energy Integrated Management System for PV Applications," 20th European Photovoltaic Solar Energy Conference, Jun. 6, 2005.

* cited by examiner

METHOD AND SYSTEM TO PROVIDE A DISTRIBUTED LOCAL ENERGY PRODUCTION SYSTEM WITH HIGH-VOLTAGE DC BUS

CLAIM OF PRIORITY

The present application claims priority to U.S. Provisional Patent Application Ser. No. 60/852,961, filed Oct. 19, 2006, which is incorporated herein by reference.

BACKGROUND

In current existing photovoltaic systems, two major problems are the amount of engineering design time required for each installation and the amount of labor required to install the photovoltaic panels and equipment. A host of factors, such as location, panel connection configuration, type of panels, type of inverter, use of batteries, etc., contribute to a need for a custom design approach. Manufacturers of photovoltaic panels provide a variety of current, voltage, and power outputs from produced panels. The potential performance from the system is rarely realized because the common method of connecting the panels in a combination of series and parallel configurations produces a system in which the panels with poorest performance degrade the performance of better panels. Once a system is installed, there is no means by which to monitor the individual panels for optimal energy production or failure, nor is there an efficient way to manage decision-making with regard to servicing the system and exchanging energy.

Existing photovoltaic systems make it very difficult to compensate for variations in photovoltaic panels. Additional complexity and expense is added to systems if all of the panels can not be oriented in the same direction. Even when great care is taken to match the photovoltaic panels in a system for optimal performance, a number of events might occur to impede the optimal performance.

One example of this diminution of optimal performance is when the shade from an object crosses a panel or portion of a panel or several panels. A power degradation occurs in the system whereby not only the power loss due to the shading occurs, but the shaded panel also consumes from other non-shaded panels or impedes power from being delivered to the system from other non-shaded panels.

In existing photovoltaic systems, Maximum Power Point Tracking (MPPT) is generally performed on the total connected panel structure rather than on each panel individually. Maximum power from the sum of the total connected panels in the structure is less than the sum of each panel's maximum power produced separately and then summed with other panels in the system. This discrepancy in total power is due to the fact that in practice it is very difficult to find all panels in any system with exactly identical characteristics so that when all panels are coupled together the poorly performing panels degrade the performance of the well performing panels. Manufacturing tolerances for photovoltaic panels are typically 5 percent to 10 percent.

Also in existing systems, because there is such a need to match the characteristics of the panels to each other so closely for optimal performance, it is very difficult to design a system that uses a variety of panels and also a variety of manufacturers of panels. Matching panel characteristics also makes it very hard to add on to the system or replace damaged panels at a later time as well, because the originally used panel may no longer be in production.

Further, existing photovoltaic systems have no way to determine which of the panels are causing the degradation in performance or which panel or component in the system may be the cause of a failure of the system to deliver power. Loss of power may be due, for example, to accumulation of dust, deposits, debris or other items lying on the panel surface, or to temperature differences due to different underlying materials etc., some of which cannot be easily detected. Also, vegetation may be a changeable influence, as for example a shading tree may shift in the wind and hence create unpredictable problems.

SUMMARY

Described herein are methods and apparatuses to use a shielded enclosure for exchanging secure data. Some embodiments are summarized in this section.

In one embodiment, a local energy production system is described that offers better efficiency and increased power production when suboptimal conditions are encountered in the local environment, offering high system reliability through redundancy and a means for fast identification of failed panels, thus allowing the system, through timely replacement of panels, to return to full rated capacity quickly. In one embodiment, a system and method are described that allow users to mix and match different panels in a system and also to mix and match panels with different output power levels.

In one embodiment, a system comprises a management unit to be interconnected via a network bus to a set of link modules, each link module coupled to a separate local energy production unit, each link module to include a Maximum Power Point Tracking (MPPT) step-up converter and a parameter monitoring unit to produce parameter data for the respective local energy production unit, and the local energy production units to be coupled to a high voltage power line to deliver produced electrical energy to a consumer of the energy; and the management unit to receive measured parameters from the link modules, and to send control signals to link modules to provide individual operational control of the local energy production units, the management unit to be coupled to one or more separate computers to provide the computers with access to the parameter data and control of the local energy production units.

The present disclosure includes methods and apparatuses which perform these methods, including data processing systems which perform these methods, and computer readable media which when executed on data processing systems cause the systems to perform these methods.

Other features of the disclosure will be apparent from the accompanying drawings and from the detailed description which follows.

BRIEF DESCRIPTION OF THE DRAWINGS

The present disclosure is illustrated by way of example and not limitation in the figures of the accompanying drawings in which like references indicate similar elements.

DESCRIPTION OF THE EMBODIMENT

In the following description, for purposes of explanation, numerous specific details are set forth in order to provide a thorough understanding of the description. It will be apparent, however, to one skilled in the art that embodiments of the disclosure can be practiced without these specific details. In other instances, structures and devices are shown in block diagram form in order to avoid obscuring the description.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
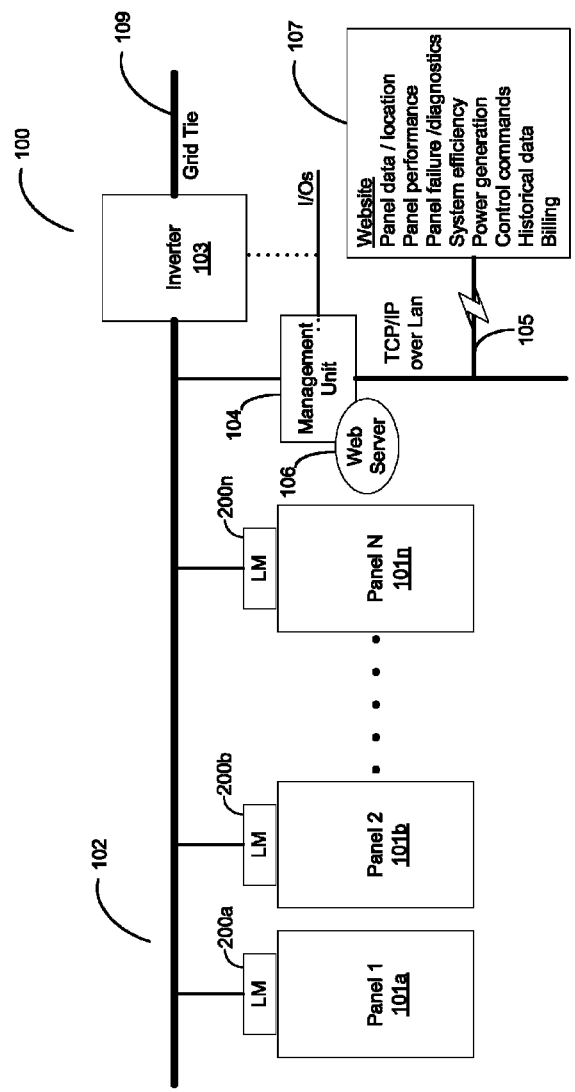
FIG. 1 illustrates an exemplary energy generation system according to one embodiment.

FIG. 1 shows an embodiment of exemplary energy generation system 100 according to one embodiment. Photovoltaic panels 101a-n are each an individual electrical energy production unit. All panels 101a-n provide power to a common Network/High Voltage Bus 102, and components of the system communicate with each other through link modules 200a-n, described in the discussion of FIG. 2, below, over bus 102. The bus feeds the produced electrical energy to a consumer of the energy, in this case grid-tied inverter 103. Alternatively, consumer 103 could be a battery storage unit or non-grid-tied inverter, or another Network/High Voltage Bus.

In one embodiment, the measured parameters from, and control for, each individual photovoltaic panel is transmitted on top of the Network/High Voltage Bus to a Management Unit 104. The Management Unit also is used for other status and control operations within the energy generation system. It can provide monitoring and control functions for optional components of the system, such as, for example, an inverter, battery energy storage unit, wind generator, hydroelectric generator, fuel cells, and other electrical energy production units. Parameters and data collected from the components of local energy production system 100 are given a time stamp as they are collected.

In one embodiment, the management Unit 104 is connected to a network using TCP/IP protocol. The network-connected Management Unit makes it possible to monitor and administer the system from any computer connected to a local area network (LAN) via connection 105. If the LAN is connected to the Internet, then control and monitoring of the system can be performed from any computer with connections to the Internet. Typically a web server 106 (software only or a separate hardware module) is added to provide, for example, web-based control and monitoring of site/software 107. In other cases, for example, direct transfer protocols maybe used to enable central communication using FTP or other, similar or proprietary protocols. Such protocols may be used to inform a central utility of actual power generated, and hence to allow a more proactive management of the electric grid. In other cases, the owner/operator of such a system may decide whether enough power has been generated to remotely turn on, for example, an air-conditioning unit, etc.

In one embodiment, a web page displayed by software instance 107 shows photovoltaic panel data, panel performance, panel failure, system efficiency, and power generation information. The web page provides a way to control the system as well. Means to enable/disable panels, inverter, battery units, and other energy producing equipment in the system are implemented. In one embodiment, the website 107 will interact with management unit 104 and that will in turn control the panels and other units and provide its information to the website for viewing or downloading. In some cases, the website may be hosted on the management unit 104, in other it may reside on a separate server. Panel level and subsystem monitoring is provided to a user or service provider through a web site or web browser. This capability enables the user or service provider to maintain the system, monitor performance for optimal performance, detect failures, and service the system when required.

In one embodiment, the web-enabled software instance 107 provides a database that can display historical data of the parameters measured. Analysis of the parameters can be performed and displayed to provide system performance tracking, trends, and insight into realizing optimal performance from the system.

In one embodiment, a power-sharing structure is built into web-based control and monitoring software 107, thus enabling consumers and producers of power within the community to trade power with each other. The power-trading schema is designed so that a real time trading of power is based on the supply and demand for power at any given time. Consumers and producers of power may decide whether to supply or consume based on the current value of the power. For example, a web-enabled air conditioning unit may be configured with a number of parameters specified by the owner of the air conditioning unit within the community to turn on if appropriate conditions are met. One obvious parameter is the temperature of the dwelling. Another obvious parameter is the cost of the power to run the conditioner.

Figure 2:
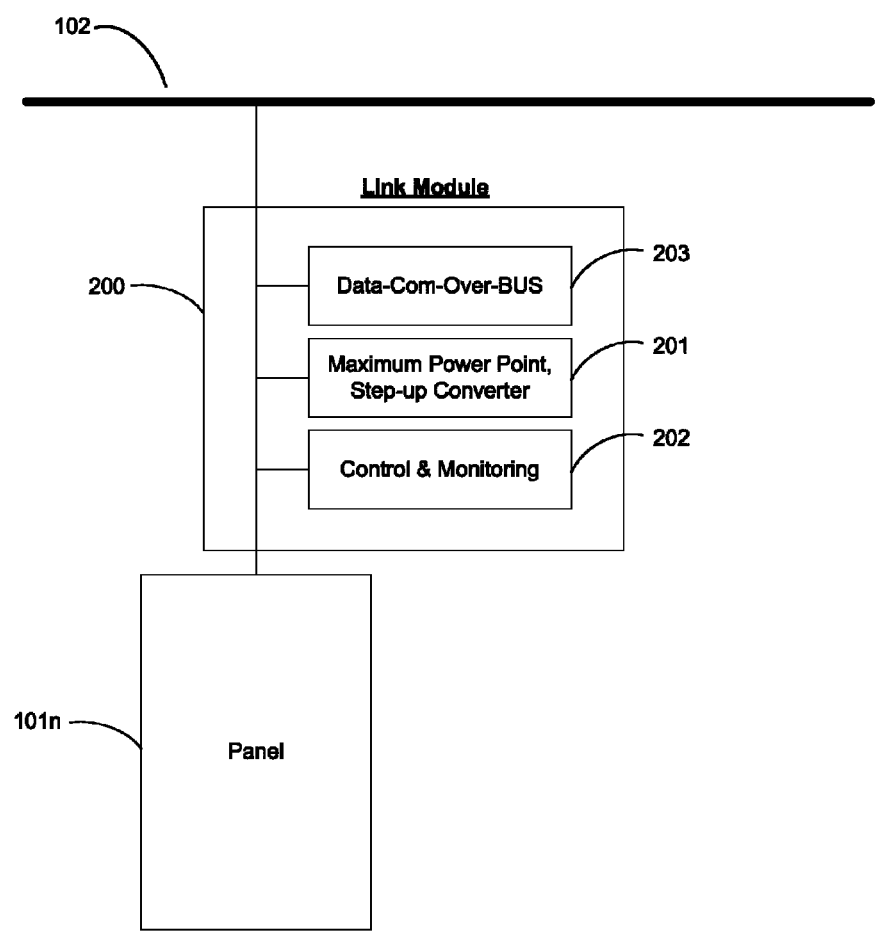
FIG. 2 illustrates a link module connected to each photovoltaic panel in the system, according to one embodiment.

FIG. 2 illustrates a link module (LM) 200 connected to each photovoltaic panel 101n in the system, in accordance with one embodiment. A link module could also be connected to other energy producing or consuming units in the system. The link module links the photovoltaic panel or energy producing/consuming unit to the Network/High Voltage Bus 102.

In one embodiment, within the link module for a photovoltaic panel a maximum power point tracking (MPPT) step-up converter 201 is implemented, thus making it possible for the performance of each panel to be decoupled from the performance of all other panels in the system. An MPPT method is implemented on each panel separately. MPPT refers to the highest energy output point on the current/voltage/exposure diagram of a panel. The MPPT for each panel is different, and each one is modulated by some of the issues discussed earlier in the background sections. By operating the panel at the MPPT, maximum energy extraction is achieved. In systems of current designs, panels are either in series (maximum current equals lowest panel current) or in parallel (maximum voltage is limited by lowest panel voltage), or in a matrix, which has the lowest maximums of all. In an example of the one embodiment of the invention described herein, each panel supplies power to the Network/High Voltage Bus separately; thus there is no longer a need to pay close attention to how each panels is matched to the other panels in the system. The panel will push the largest current it can onto the bus, but cap it at a maximum open end voltage. The actual current of each panel will be limited by the MPPT wattage and the actual bus voltage. Panels from many different manufacturers with wide parameter differences can be connected to the same Network/High Voltage Bus. Manufacturers of photovoltaic panels using the system according to one embodiment may find they need not focus on costly wafer sorting methods to match panels closely, thus reducing cost of panels produced.

In one embodiment, the link module also contains a Control and Monitoring Unit 202 that produces panel parameter information. Said information is then fed to the Data-Com-Over-Bus Unit 203 also within the link module. Parameters may include current, voltage, temperature, and panel identification code (ID) per the panel. Link modules for specific applications other than for photovoltaic panels could be implemented that could include other or more parameters than those mentioned above. Control of each panel is provided to turn on and off power from the panel to the Network/High Voltage Bus 102. Transmission of a signal from the Management Unit over the Network/High Voltage Bus to each individual photovoltaic panel provides the method to power on or off a specific photovoltaic panel by sending commands from management unit 104 to one or more Control and Monitoring Units 202a-n.

In one embodiment, in the link module, electric circuits in combination with a microcontroller measure and accordingly generate the panel parameters. The microcontroller has data acquisition (DAQ) functionality to allow implementation of the measurements. The voltage measurement method consists of a circuit measuring the voltage with reference to the positive and negative conductors of the photovoltaic panel. The current measurement method consists of a circuit measuring the voltage across a low ohm value resistance along the conduction path of power out of the panel to the step-up converter that feeds the Network/High Voltage Bus. The known resistance value and measured voltage then provides the calculated current value. The temperature measurement method consists of a circuit measuring the voltage generated by, for example, a thermo-couple device on a suitable surface point(s) of the photovoltaic panel.

In one embodiment, communication along the Network/High Voltage Bus is conducted such that only one transmitter can be active at any one time. Each link module's Data-Com-Over-Bus Unit 203 has a transceiver that is in a slave mode of operation in which it will not transmit until after receiving a command from a master. The Management Unit 104 is the master. In some cases, the communication may be overlaid or modulated onto the high voltage bus; while in other cases a separate wiring is used. The Management Unit may initiate or respond to communication on the Network/High Voltage Bus.

In one embodiment, the Network/High Voltage Bus uses the same conductors to communicate and deliver power, thus simplifying installation and maintenance of the system. Reduced material cost is also realized, because a high-voltage conductive path requires lighter gauge wire to deliver power efficiently, as compared to low-voltage systems. In general, simpler wire routing and less conductive material may be used with the Network/High Voltage Bus system, compared to a need for stringing units in series or some other multi-conductor wiring scheme in existence presently in photovoltaic systems.

In one embodiment, the use of a Network/High Voltage Bus makes it easier to do maintenance on the system while it is in operation as well. Individual panels can be identified, repaired, added and removed from the system even when the system is on, mainly due to designing out the need for any series connections in the system.

In one embodiment, the Network/High Voltage Bus 102 may also be referred to as a High-Voltage DC (HVDC) Bus. The voltage on the HVDC Bus may be approximately around 400 VDC. However, a range of voltages may be considered acceptable. The range can also serve a useful purpose (i.e., to communicate something to units connected to it). In one embodiment, the HVDC Bus is restricted from exceeding a predetermined voltage, because the selected components (e.g., inverter 103) within the system can not tolerate a voltage beyond a particular point without being damaged. In one embodiment, the HVDC Bus is restricted from falling below a particular voltage, to have enough potential for many consumers of the energy. For example, in one embodiment the HVDC Bus cannot supply the grid through a particular inverter 103 if the voltage on it drops below a minimum value. In some cases, rather than an HVDC bus, an HVAC bus may be used. However, it may or may not have the same voltage and/or frequency as the grid 109.

In most electrical systems where electrical energy is provided to components of the system, control of the voltage level of the electrical energy is done by the supplier of the energy or the "power supply". This scheme, however, is not the case in a system in which the supplier of the electrical energy has a point in its operating range where the current and voltage provided produce a maximum power output under the current working conditions of the unit. For a photovoltaic cell, this point is called the maximum power point (MPP). An electrical device that can take power from the photovoltaic cell at the cells' MPP is said to have MPP tracking or MPPT functionality. Given the desirability of pulling the most power possible from the photovoltaic cell under the given conditions, a power supply is then designed to provide feedback at its input, not its output. Ideally, given a very efficient power supply, input power equals output power. There is no way to provide control on both the input and the output and maintain the efficiency of the power supply (unless the supply has some means to store energy). In the exemplary embodiment described herein, only the input side is controlled to maintain MPPT, because there is an alternative way to control the output side, which in this example is the HVDC Bus. Because the grid has infinite capacity to absorb the energy from the HVDC Bus compared to the size of the photovoltaic system, it becomes the function of the inverter that pulls the energy from the HVDC Bus and puts the energy on the grid to control the HVDC Bus voltage. Like the supply that maintains the MPPT for the solar cell, the inverter also provides feedback on its input not its output. It maintains the HVDC Bus voltage by dumping enough current onto the grid to keep the HVDC Bus within a desired range.

Different kinds of strategies may be employed for control of the power supply that feeds the HVDC Bus constituted by panel 101 and step-up converter 201. In one embodiment, a step-up converter could be operated to act as a current source into the HVDC bus 102. In one embodiment, the step-up converter has a cap to control the voltage for cases in which the inverter 103 is not maintaining sufficient output. This insufficient output can happen for various reasons, such as shorts, disconnects, islanding, etc.

In one embodiment, the HVDC Bus as described herein provides an alternative to distributing power and replace existing AC grids. In one embodiment, the replacement is done initially on a very small level—within the house, house to house, block by block, development by development, and community by community. In one embodiment, the infrastructure is grown from small pockets of connected units.

In one embodiment, the HVDC Bus is used to distribute power from solar panels via a DC to DC converter to an inverter that is tied to the grid. In a second embodiment, the HVDC Bus includes a battery storage unit connected to it, or includes electrical devices within the house that use the HVDC Bus voltage directly by way of switching power methods. Pluggable hybrid cars could also connect directly to an HVDC Bus.

In one embodiment, the HVDC bus communicates the amount of power available. Consider the embodiment of a distributed energy system that uses an HVDC Bus to distribute the energy. When the voltage is higher in the range, producers of energy are numerous compared to consumers and the price of the energy has a lower price. When the voltage is lower in the range, producers of energy are limited compared to the number of consumers and the price of the energy is high. In one embodiment of a distributed system where there is a variety of both producer units and consumer units, each unit determines whether to participate by connecting to the HVDC Bus based on the HVDC Bus voltage (i.e., cost/pay). In one embodiment, a storage mechanism such as a battery bank in a hybrid car could be both a consumer and a producer on this system. In one embodiment, large storage devices such as a vanadium redox flow battery system are both a producer and consumer in this system (buy low when alternate energy sources are plentiful or in low demand times and sell high at peak periods).

Figure 3:
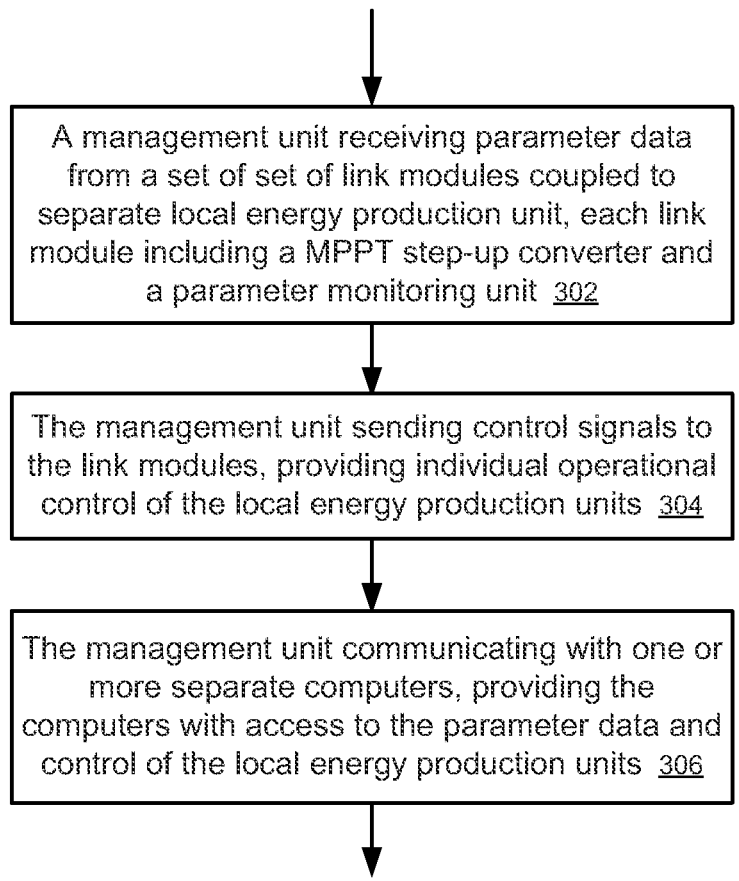
FIG. 3 illustrates a flow diagram describing a process according to one embodiment.

One embodiment comprises a method to provide a distributed local energy production system with high-voltage DC bus, as described in the flow process of FIG. 3. In process 302, a management unit receives parameter data from a set of set of link modules, with each link module coupled to a separate local energy production unit, each link module including a Maximum Power Point Tracking (MPPT) step-up converter and a parameter monitoring unit producing the parameter data for the respective local energy production unit, and the local energy production units coupled to a high voltage power line to deliver produced electrical energy to a consumer of the energy.

In process 304, the management unit sends control signals to the link modules, providing individual operational control of the local energy production units. And, in process 306 the management unit communicating with one or more separate computers, providing the computers with access to the parameter data and control of the local energy production units.

From this description, it will be appreciated that certain aspects are embodied in the user devices, certain aspects are embodied in the server systems, and certain aspects are embodied in a system as a whole. Embodiments disclosed can be implemented using hardware, programs of instruction, or combinations of hardware and programs of instructions.

In general, routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

While some embodiments have been described in the context of fully functioning computers and computer systems, those skilled in the art will appreciate that various embodiments are capable of being distributed as a program product in a variety of forms and are capable of being applied regardless of the particular type of machine or computer-readable media used to actually effect the distribution.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The instructions may be embodied in digital and analog communication links for electrical, optical, acoustical or other forms of propagated signals, such as carrier waves, infrared signals, digital signals, etc.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

Aspects disclosed may be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

In various embodiments, hardwired circuitry may be used in combination with software instructions to implement the techniques. Thus, the techniques are neither limited to any specific combination of hardware circuitry and software nor to any particular source for the instructions executed by the data processing system.

In this description, various functions and operations are described as being performed by or caused by software code to simplify description. However, those skilled in the art will recognize what is meant by such expressions is that the functions result from execution of the code by a processor, such as a microprocessor.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

Although the disclosure has been provided with reference to specific exemplary embodiments, it will be evident that the various modification and changes can be made to these embodiments without departing from the broader spirit as set forth in the claims. Accordingly, the specification and drawings are to be regarded in an illustrative sense rather than in a restrictive sense.

What is claimed is:

1. A system, comprising:
   a direct current (DC), high voltage power line configured to operate at a voltage to deliver electrical energy to a consumer of the energy;
   a plurality of photovoltaic panels, each respective photovoltaic panel of the plurality of photovoltaic panels having a respective link module coupled between the DC, high voltage power line and the respective photovoltaic panel, the respective link module configured to provide electricity produced by the respective photovoltaic panel solely to the DC, high voltage power line, the respective link module including a transceiver configured in a slave mode of operation to transmit data using the DC, high voltage power line, after receiving a command, a Maximum Power Point Tracking (MPPT) step-up converter to convert a voltage produced by the respective photovoltaic panel to the voltage of the DC, high voltage power line, and a parameter monitoring unit to produce parameter data for the respective photovoltaic panel;

an inverter configured to transfer electricity from the direct current (DC), high voltage power line to a utility grid; and a management unit coupled to the direct current, high voltage power line to transmit the command to the transceiver of the respective link module and coupled to a local area network to communicate with internet, the management unit to receive the parameter data from the transceiver of the respective link module, and to send control signals to the transceiver of the respective link module to provide individual operational control of the respective photovoltaic panel, wherein the management unit including a web server configured to show photovoltaic panel data, panel performance, panel failure, system efficiency, and power generation information.

2. The system of claim 1, wherein a network bus and the high voltage power line are joined on a common wire providing a network high voltage bus.

3. The system of claim 1, wherein the consumer of energy is a grid tied inverter.

4. The system of claim 2, wherein the consumer of energy is one or more of a battery storage unit, a grid tied inverter, a stand alone inverter, a hybrid with automatic transfer switch inverter, a charge controller, a plug-in hybrid automobile, an electric car, and a second network high voltage bus.

5. The system of claim 2, wherein the (MPPT) MPPT step-up converter is to decouple a performance of the respective local energy production unit photovoltaic panel from separate local energy production units photovoltaic panels coupled to the network high voltage bus.

6. The system of claim 2, wherein the parameter data from the local energy production units photovoltaic panels comprises one or more of current, voltage, temperature, and panel identification code.

7. The system of claim 6, wherein the management unit is to transmit power-on and power-off signals to the link modules via the network high voltage bus to power-on and power-off individual local energy production units the photovoltaic panels.

8. The system of claim 7, wherein the photovoltaic panels one or more of the local energy production units comprise a local power-on and power-off control.

9. The system of claim 2, wherein the network high voltage bus comprises a set of conductors to transmit data and control signals, and deliver power.

10. The system of claim 2, wherein the management unit is to receive parameter data from one or more consumers of energy.

11. The system of claim 10, wherein the management unit is to control delivery of electrical energy to one or more consumers of energy based on parameter data received from one or more consumers of energy.

12. A method comprising:

receiving, by a management unit, parameter data from a plurality of link modules coupled between a direct current (DC), high voltage power line and a plurality of local energy production units respectively, the direct current (DC), high voltage power line having a voltage to deliver electrical energy a consumer of the energy, each respective photovoltaic panel of the plurality of photovoltaic panels having a respective link module, the respective link module configured to provide electricity produced by the respective photovoltaic panel solely to the DC, high voltage power line, the respective link module including a transceiver configured in a slave mode of operation to transmit data using the DC, high voltage power line, after receiving a command, a Maximum Power Point Tracking (MPPT) step-up converter to convert a voltage produced by the respective photovoltaic panel to the voltage of the DC, high voltage power line, and a parameter monitoring unit to produce the parameter data for the respective photovoltaic panel;

sending by the management unit control signals to the link modules, the control signals providing individual operational control of the local energy production units;

communicating by the management unit with one or more separate computers to provide the computers with access to the parameter data and control of the local energy production units; and providing, by the management unit coupled to the direct current, high voltage power line to transmit the command to the transceiver of the respective link module and coupled to a local area network to communicate with internet, a web server configured to show photovoltaic panel data, panel performance, panel failure, system efficiency, and power generation information.

13. The method of claim 12, further comprising receiving the parameter data and sending the control signals on a network bus; and the network bus and the high voltage power line are joined on a common wire providing a network high voltage bus.

14. The method of claim 13, wherein the consumer of energy is one of: a grid tied inverter, a battery storage unit, a non grid non-grid tied inverter, a charge controller, a plug-in hybrid automobile, an electric car, and a second network high voltage bus.

15. The method of claim 13, wherein one or more of the local energy production units is at least one of a photovoltaic panel, a wind turbine, fuel cells, and a hydroelectric turbine.

16. The method of claim 13, wherein the method further comprises the (MPPT) MPPT step-up converter decoupling a performance of a first local energy production unit from separate local energy production units coupled to the network high voltage bus.

17. A non-transitory computer readable medium having stored thereon a set of instructions, which when executed on a computer cause the computer to perform a method comprising:

receiving, by a management unit, parameter data from a plurality of link modules coupled between a direct current (DC), high voltage power line and a plurality of local energy production units respectively, the direct current (DC), high voltage power line having a voltage to deliver electrical energy a consumer of the energy, each respective photovoltaic panel of the plurality of photovoltaic panels having a respective link module, the respective link module configured to provide electricity produced by the respective photovoltaic panel solely to the DC, high voltage power line, the respective link module including a transceiver configured in a slave mode of operation to transmit data using the DC, high voltage power line, after receiving a command, a Maximum Power Point Tracking (MPPT) step-up converter to convert a voltage produced by the respective photovoltaic panel to the voltage of the DC, high voltage power line, and a parameter monitoring unit producing the parameter data for the respective photovoltaic panel;

sending by the management unit control signals to the link modules, the control signals providing individual operational control of the local energy production units;

communicating by the management unit with one or more separate computers to provide the computers with access to the parameter data and control of the local energy production units; and providing, by the management unit coupled to the direct current, high voltage power line to transmit the command to the transceiver of the respective link module and coupled to a local area network to communicate with internet, a web server configured to show photovoltaic panel data, panel performance, panel failure, system efficiency, and power generation information.

* * * * *